United States Patent [19]
Allard

[11] 3,919,170
[45] Nov. 11, 1975

[54] ARYLENE-BIS(PHENYLENE-PHOSPHINIC ACID)-4,4'-DI-CARBOXAMIDE POLYMERS

[75] Inventor: Pierre Allard, Cailloux-sur-Fontaines, France

[73] Assignee: Rhone-Poulenc-Textile, Paris, France

[22] Filed: July 22, 1974

[21] Appl. No.: 490,751

[30] Foreign Application Priority Data
July 24, 1973  France............ 73.27316
July 24, 1973  France............ 73.27317

[52] U.S. Cl. ........ 260/47 CB; 260/30.2; 260/63 N; 260/77.5 R; 260/78 R; 260/78 TF
[51] Int. Cl.[2] .................................. C08G 73/14
[58] Field of Search ... 260/47 CB, 47 CP, 49, 78 R, 260/78 TF, 65, 63 N, 77.5 R

[56] References Cited
UNITED STATES PATENTS

| | | | |
|---|---|---|---|
| 3,448,087 | 6/1969 | Ballentine et al. | 260/78 |
| 3,531,437 | 9/1970 | Armand | 260/47 |
| 3,787,372 | 1/1974 | Blocker et al. | 260/78 |

*Primary Examiner*—Lester L. Lee
*Attorney, Agent, or Firm*—Stevens, Davis, Miller & Mosher

[57] ABSTRACT

The present invention concerns new thermostable, noninflammable polymers which are free of post-incandescence phenomenon comprising in addition to at least one of the amide and imide linkages, arylene bis(phenylene phosphinic)-4,4'dicarboxamide metal salt linkages.

The products shaped from these polymers are of use in industrial fields and for protective clothing.

7 Claims, No Drawings

ARYLENE-BIS(PHENYLENE-PHOSPHINIC ACID)-4,4'-DI-CARBOXAMIDE POLYMERS

This invention relates to aromatic polymers and their preparation, and to filaments and films made therefrom.

Various aromatic polyamide-imides are already known and some, like those described in French Pat. No. 1,600,067, possess valuable heat-resistance properties. Known aromatic polyamides have similar properties, but they show the objectionable phenomenon of post-incandescence. By "post-incandescence" is meant the slow combustion of a material at red heat after all flames have ceased.

It is known from French Pat. Nos. 1,525,338 and 1,584,816 to introduce units originating from a diamine-diaryl-phosphinic acid compound into a polyamideimide or into a polyamide in order to improve the fire-resistance of these polymers. However, such phosphorus-containing diamines cannot be used in the preparation of polymers by the reaction of diisocyanates with acids or anhydrides because they lead to polymers which are not heat-resistant.

Furthermore, French Pat. No. 1,243,066 describes a process for the manufacture of copolyesters with improved dyeing affinity containing alkali metal phosphinate units of the formula:

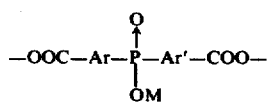

The present invention provides new aromatic polymers which can be shaped into yarns, fibres or films and which are heat-resistant, non-inflammable and free from post-incandescence, which comprise: units of a metal salt of an arylene-bis-(phenylenephosphinic acid)-4,4'-dicarboxamide of the formula:

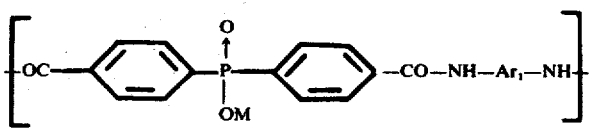

with units of at least one of the two types:
diamides units of the formula
$+NH - Ar_1 - NH - CO - Ar - CO+$,
amide-imide units of the formula:

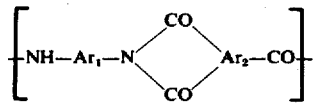

and optionally with diimide units of the formula:

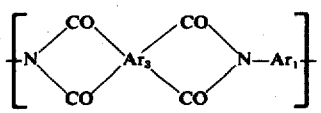

in which Ar represents a divalent aromatic, or arylaliphatic radical, $Ar_1$ represents a divalent aromatic radical, $Ar_2$ represents a trivalent aromatic radical, $Ar_3$ represents a tetravalent aromatic radical, and M represents an alkali metal, the units of the metal salt of the arylene-bis-(phenylene-phosphinic acid)-4,4'-dicarboxamide being present in a proportion of at least 2, and preferably at least 4, per 100 units in the polymer.

The invention also provides a process for the preparation of these phosphorus-containing polymers which comprises reacting together an aromatic diisocyanate of formula $OCN—Ar_1—NCO$, and an alkali metal salt of bis-(4-carboxy-phenyl)-phosphinic acid of formula:

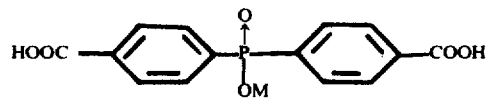

with at least one acid reagent selected between a dicarboxylic acid of formula $HOOC—AR—COOH$ and an aromatic acid anhydride of formula:

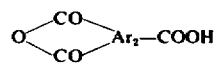

(wherein $Ar_1$, Ar, $Ar_2$ and M are as hereinbefore defined), in an anhydrous aprotic polar solvent medium, in substantially stoichiometric proportions, the temperature of the reaction mixture being raised gradually, during the reaction, to at least 160°C., and preferably at least 190°C.

The reaction mixture may also contain an aromatic dianhydride of formula:

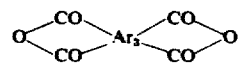

wherein $Ar_3$ is a defined above.

In the formulae given above, Ar and $Ar_1$ represent a divalent aromatic radical with bonds either in the meta-position, or preferably in the para-position such as

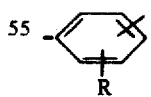 or 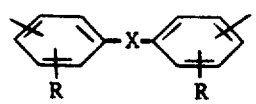

X being a valency bond, $— O —$, $— CR_2 —$ (where R is hydrogen or methyl),

or — $SO_2$ —. Examples of diisocyanates of formula $OCN-Ar_1-NCO$ are tolylene-diisocyanates (the 2,4-isomer or mixtures of the 2,4- and 2,6-isomers), 4,4′-diisocyanato-diphenylpropane and more particularly 4,4′-diisocyanatodiphenylmethane and 4,4′-diisocyanato-diphenyl ether.

Examples of diacids are tolylene dicarboxylic acids, 4,4′-dicarboxylic-diphenylmethane or-diphenylpropane, 4,4′-dicarboxylic diphenylether acids more particularly terephthalic acid or isophthalic acid. The proportion of this diacid in the reaction mixture is generally between 5 and 98, and preferably between 10 and 80 mols, per 100 mols of all the acid reagents.

The alkali metal salt of bis-(4-hydroxy-phenyl)-phosphinic acid, present in the proportion of at least 2 mols, and preferably at least 4 mols, per 100 mols of all the acid reagents, can be the potassium or lithium salt, but is preferably the sodium salt.

Trimellitic and benzophenone 3,4,3′ (or 4′)-tricarboxylic anhydrides are preferably used as the aromatic acid anhydride and the aromatic dianhydride is preferably pyromellitic dianhydride, or benzophenone-3,4,3′,4′-tetracarboxylic anhydride.

By "substantially stoichiometric proportions" as used herein is to be understood molar ratios of acid reagents to diisocyanates which are between 0.90:1 and 1.20:1.

The polar aprotic anhydrous solvent should contain less than 600 ppm of water, and may be, e.g., a linear or cyclic amide or phosphoramide such as dimethylformamide, dimethylacetamide, hexamethylphosphoramide, or tetramethyl-urea, and preferably N-methyl-2-pyrrolidone or s sulphone such as tetramethylesulphone.

The solvent medium can also comprise a certain proportion of solvent which is inert towards the reagents under the working conditions, e.g. xylene or toluene, in a proportion such that the copolyamide is soluble in the mixed solvent.

A polycondensation catalyst, such as a tertiary amine, and an agent which breaks hydrogen bonds, such as LiCl or $CaCl_2$, can optionally be added to the reaction mixture. It is also possible to add fillers, pigments, optical blueing agents and other products which are inert with respect to the reaction.

The reagents can be dissolved simultaneously in the solvent or they can be dissolved separately and then the solutions mixed. In some cases, the diacids may be only partially soluble at ambient temperature in the solvent used; they are then used as a dispersion, dissolution being completed during the reaction.

The concentration of all the reagents in the starting solution is between 5 and 50% and preferably between 20 and 40%, expressed as the weight of polymer produced per 100 g of solution, that is to say after deducting the weight of $CO_2$ eliminated in the condensation between the isocyanate and carboxyl groups.

The various starting materials may be introduced into a reactor equipped with a stirring system, a thermometer sleeve, a reflux condenser and an inlet for dry nitrogen, and the temperature of which is between 20°C and 130°C. The reagents are preferably mixed at ambient temperature. The temperature of the reaction mixture is then raised at a rate of between 0.1°C. and 5°C per minute; a large amount of $CO_2$ is evolved between 80° and 135°C. The change in temperature can be continuous or discontinuous. In a preferred embodiment of the process, the temperature if kept constant for approximately 2 hours at a temperature between 110° and 170°C, and preferably at 135°C, before the temperature is raised to at most 200°C.

At the end of the operation, a solution is obtained which has an absolute viscosity of between 200 and 5,000 poises, achieved, where appropriate, by diluting the final mixture with the necessary amount of solvent.

During the entire operation, adequate stirring is maintained to ensure uniform heating which is absolutely necessary in order that the reaction shall take place satisfactorily.

The phosphorus-containing polymers obtained have inherent viscosities greater than 0.5.

Their solutions can be extruded in the form of a yarn or cast in the form of a film, under wet or dry conditions, in accordance with known processes such as, for example, that described in French Pat. No. 2,079,785. The shaped products formed are heat-resistant, noninflammable and free from the phenomenon of postincandescence. They are particularly valuable in numerous fields such as furnishing, protective clothing and industrial applications.

The following Examples illustrate the invention. In these Examples, the absolute viscosity of the solutions was measured at 25°C with an Epprecht-Rheomat 15 apparatus.

The inherent viscosity $$\eta_{inh} = \frac{Ln(t/t_o)}{C}$$

was measured at 25°C using a solution containing 0.5 g of polymer in 100 ml of the solvent used to prepare the polymer, $t$ and $t_o$ being the flow times of the solution and of the solvent, and C being the concentration of the solution expressed as weight per volume.

The tensometric characteristics of the fibres were measured after they have been conditioned at 22°C and at a relative humidity of 65%.

The tests for measuring the degree of inflammability and post-incandescence were carried out on knitted fabrics weighing about 90 g/m², the knitted fabrics having been desized and conditioned at 22°C at a relative humidity of 65%. The tests used were: the measurement of the LCOC index (Limiting Concentration of Oxygen for Combustion) by ASTM Standard Specification B 2863-70 relating to plastic test pieces, modified and adapted to textile samples of dimensions 5 × 16 cm mounted on a rectangular frame; the AATCC 34-1969 test developed in the U.S.A. which gives the duration of combustion after applying a flame fed with a gas mixture ($H_2 + CH_4 + C_2H_6 + CO$) for 12 seconds and then withdrawing the flame, and the duration of post-incandescence after the flame is extinguished; and the gas flame test carried out on samples 5 cm × 15 cm. In the last test, the sample is placed over a horizontal rod and is fixed to the latter at one of its ends; the flame of a Bunsen burner is applied for 5 seconds to the free end of the sample; if extinction takes place afater the flame is withdrawn, the flame is applied again for 10 seconds, then 20 and then 30 seconds if necessary, and the duration of the successive combustions is noted. The post-incandescence, which is the duration of slow combustion of the material which has been brought to red heat, after any flame has ceased, is expressed in seconds.

EXAMPLE 1

The monosodium salt of bis-(4-carboxy-phenyl)-phosphinic acid is prepared in the following way:

2,448 g. (8 mols) of bis-(4-carboxy-phenyl)-phosphinic acid and 10 liters of N-methyl-2-pyrrolidone are introduced into a 20 liter reaction flask. The mixture is stirred with a deflocculating turbine for 10 minutes at ambient temperature to cause the acid to dissolve. A few undissolved impurities remain and are removed by decanting and filtration. The solution is then reintroduced into the reactor and 310 g. (7.76 mols) of sodium hydroxide and 2 litres of deionised water are rapidly added in drops over the course of 1 hour with vigorous stirring by the turbine.

After 30 minutes, precipitation begins and the temperature of the medium rises to 45°C. It is cooled with stirring and left to stand overnight. It is filtered through a Buchner funnel covered with diatrose and flannelette. The filtrate is light yellow and the precipitate which is the desired salt is very white. The salt is dried for one day in an oven under a moist vacuum, the temperature being gradually raised to 200°C. The yield is 88.7% and the proportion of —COOH is 97.5% of theory.

The polymer is then prepared in the following way: 356 g. (1.4 mols) of 99% pure 4,4'-diisocyanato-diphenyl ether, 252.6 g. (1.315 mols) of trimellitic anhydride, 28.2 g. (0.084 mol) of the 97.5% pure monosodium salt of bis-(4-carboxy-phenyl)-phosphinic acid and 1,720 g. of N-methyl-2-pyrrolidone are introduced into a 4 litre reactor heated to 80°C. The temperature of the mass is raised to 135°C., over the course of 35 minutes and then kept at this value for 30 minutes, during which time a large amount of $CO_2$ is evolved. The temperature is then raised to 200°C., over the course of 50 minutes, followed by another temperature plateau lasting for 25 minutes before the heating is stopped. During cooling, the polymer solution obtained is gradually diluted with a total of 1,650 g. of N-methylpyrrolidone. The final solution has an absolute viscosity of 560 poises and a solids content of 14% (expressed by weight) and the dissolved polymer has an inherent viscosity of 1.27.

This solution is wet spun by extrusion, through a spinneret heated to 80°C., and possessing 640.05 mm. diameter holes, into a coagulation bath consisting of 61 parts of N-methylpyrrolidone and 39 parts of water (expressed by weight) at 20°C. After passing through this bath over a distance of 45 cm. at the rate of 11 m/minute, the coagulated yarn is stretched in air in a ratio of 1.8 and then washed with water on a roller, dried and wound up at the rate of 20 m/minute.

The mechanical characteristics of the yarn are then:

| | |
|---|---|
| gauge per filament | 4.98 dtex |
| tenacity | 18.9 g/tex |
| elongation at break | 22.1% |

This yarn can be additionally stretched by passing through a tube at 340°C., in air, at the rate of 15 m/minute. The additional stretching in a ratio of 2.61 brings the mechanical characteristics to the following values:

| | |
|---|---|
| gauge per filament | 1.80 dtex |
| tenacity | 66.3 g/tex |
| elongation at break | 9.6% |

Table I gives the results of the inflammability tests on a knitted fabric.

TABLE I

| | "LCOC" index | Height destroyed in cm. | Application of the flame in seconds | Duration of combustion in seconds | Post-incandescence in seconds |
|---|---|---|---|---|---|
| "LCOC" index | 29.6 | | | | |
| AATCC 34-1969 test | | 10 | | 0 | 0 |
| Gas flame test | | | 5 | 1 | 0 |
| | | | 10 | 6 | 0 |
| | | | 20 | 0 | 0 |
| | | | 30 | 0 | 0 |

The post-incandescence of this sample are zero.

EXAMPLE 2

The following reagents are introduced into a 4 liter reactor heated to 100°C: 380 g. (1.52 mols) of 98.7% pure 4,4'-diisocyanato-diphenylmethane; 276.5 g. (1.44 mols) of trimellitic acid, 20.6 g. (0.06 mol) of the 97.5% pure monosodium salt of bis-(4-carboxy-phenyl)-phosphinic acid as prepared in Example 1, and 1,635 g. of N-methyl-2-pyrrolidone. The temperature is raised to 135°C., for the first 25 minutes and then to 140°C., for the following 30 minutes. During the heating at 140°C., a large amount of $CO_2$ is evolved. The temperature is then raised at the rate of 1.16°C./minute to 200°C. While the reaction mass is being cooled, it is diluted by gradually adding 960 g. of N-methylpyrrolidone. The final solution has a viscosity of 480 poises and a solids content of 16.25% (expressed by weight) and the dissolved polymer has an inherent viscosity of 1.16.

This solution is extruded through a spinneret heated to 80°C, possessing 640.05 mm. diameter holes, into a coagulation bath consisting of 70 parts of N-methylpyrrolidone and 30 parts of water (expressed by weight) at 20°C. After passing through this bath over a distance of 45 cm. at the rate of 11 m/minute, the coagulated yarn is stretched in air in a ratio of 2.4 and is then washed with water on a roller, dried and wound up at the rate of 27 m/minute. At this stage, the mechanical characteristics of the yarn are:

| | |
|---|---|
| gauge per filament | 5.02 dtex |
| tenacity | 25.2 g/tex |
| elongation at break | 29.1% |

An additional stretching in a 2 metre tube at 340°C, in air, at the rate of 15 m/minute, brings these characteristics to the following values:

| | |
|---|---|
| gauge per filament | 2.17 dtex |
| tenacity | 57.6 g/tex |
| elongation at break | 15.1% |

The results of the inflammability tests, carried out on a knitted fabric, are given in Table II.

TABLE II

| | "LCOC" index | Height destroyed in cm. | Application of the flame in seconds | Duration of combustion in seconds | Post-incandescence in seconds |
|---|---|---|---|---|---|
| "LCOC" index AATCC 34-1969 test | 31 | 6 | | 4 | 0 |
| Gas flame test | | | 5 | 0 | 0 |
| | | | 10 | 3 | 1 |
| | | | 20 | 2 | 0 |
| | | | 30 | 2 | 0 |

The post-incandescence of the fabric is zero.

EXAMPLE 3

356 g. (1.4 mols) of 99% pure 4,4'-diisocyanatodiphenyl ether, 215 g. (1.12 mols) of trimellitic anhydride, 57.9 g. (0.224 mol) of 99.8% pure 4,4'-dicarboxy-diphenyl ether, 18.8 g. (0.056 mol) of the 97.5% pure monosodium salt of bis-(4-carboxyphenyl)-phosphinic acid as prepared in Example 1, and 1,756 g. of N-methyl-2-pyrrolidone are introduced into a 4 liter reactor heated to 80°C. The reaction is carried out in accordance with a temperature programme similar to that of Example 1, and the solution is diluted during the cooling process by adding 1,320 g. of N-methylpyrrolidone. At the final stage, the absolute viscosity of the solution is 610 poises for a solids content of 15.57% (expressed by weight) and the inherent viscosity of the dissolved polymer is 1.20.

This solution is spun through a spinneret possessing 64 0.05 mm. diameter holes and heated to 80°C, into a bath at 20°C, consisting of 60 parts of N-methylpyrrolidone and 40 parts of water (expressed by weight). On issuing from the bath, the gel is stretched in air in a ratio of 1.9 and then washed with water on a roller and wound up at the rate of 21 m/minute. The yarn obtained has the following mechanical characteristics:

| | |
|---|---|
| gauge per filament | 4.5 dtex |
| tenacity | 21.8 g/tex |
| elongation at break | 19.1% |

After additional stretching in a tube of length 2 metres, at a temperature of 340°C, and a rate of 15 m/minute, these characteristics become:

| | |
|---|---|
| gauge per filament | 0.81 dtex |
| tenacity | 44.9 g/tex |
| elongation at break | 9.1% |

The result of the imflammability tests are given in Table III.

TABLE III

| | "LCOC" index | Application of the flame in seconds | Duration of combustion in seconds | Post-incandescence in seconds |
|---|---|---|---|---|
| "LCOC" index | 28.4 | | | |
| Gas flame test | | 5 | 5 | 0 |
| | | 10 | 0 | 0 |
| | | 20 | 3 | 0 |

The post-incandescence of this sample is zero.

EXAMPLE 4

380 g. (1.5 mols) of 98.75% pure 4,4'-diisocyanatodiphenyl-methane, 247 g. (1.29 mols) of trimellitic anhydride, 39 g. (0.15 mol) of 99.85% pure 4,4'-dicarboxy-diphenyl ether, 20.6 g. (0.06 mol) of the 97.5% pure monosodium salt of bis-(4-carboxyphenyl)-phosphinic acid as prepared in Example 1, and 1,500 g. of N-methyl-2-pyrrolidone are introduced into a 4 liter reactor. Polycondensation is carried out in accordance with the temperature programme described in Example 2. 1,140 g. of N-methylpyrrolidone are added to the solution as it cools, and the solution obtained has the following characteristics: absolute viscosity, 475 poises; solids content, 17.3% (by weight); and inherent viscosity of the dissolved polymer, 1.13.

The solution is then spun through a spinneret possessing 64 0.05 mm. diameter holes and kept at 120°C, into a coagulation bath at 20°C, consisting of 65 parts of N-methylpyrrolidone and 35 parts of water (expressed by weight). After stretching in air in a ratio of 2.1, washing with water on a roller, and drying, the yarn is wound up at the rate of 24 m/minute. Its tensometric characteristics are:

| | |
|---|---|
| gauge per filament | 5.54 dtex |
| tenacity | 21.2 g/tex |
| elongation at break | 28.6% |

After additional stretching in a tube, in air, at a temperature of 340°C, and a rate of 15 m/minute, these figures become:

| | |
|---|---|
| gauge per filament | 2.01 dtex |
| tenacity | 53.2 g/tex |

-continued elongation at break    16.9%

Table IV gives the inflammability characteristics of a knitted fabric produced with this yarn.

TABLE IV

| | "LCOC" index | Height destroyed in cm. | Application of the flame in seconds | Duration of combustion in seconds | Post-incandescence in seconds |
|---|---|---|---|---|---|
| "LCOC" index | 31 | | | | |
| AATCC 34-1969 test | | 6 | | 5 | 3 |
| Gas flame test | | | 5 | 26 | 0 |
| | | | 10 | 2 | 0 |
| | | | 20 | 3 | 0 |
| | | | 30 | 5 | 0 | s

EXAMPLE 5

2,138 g. (8.5 mols) of 99.4% pure 4,4'-diisocyanatodiphenyl-methane, 1,306 g. (6.80 mols) of trimellitic anhydride, 226 g. (1.36 mols) of terephthalic acid, 116.5 g. (0.34 mol) of the 97.5% pure monosodium salt of bis-(4-carboxy-phenyl)-phosphinic acid as prepared in Example 1, and 8,877 g. of N-methyl-2-pyrrolidone are introduced into a 20 liter reactor heated to 85°C. Over the course of 45 minutes, the reaction mixture is heated to 135°C, and is kept at this value for 30 minutes. The temperature is then again raised to 198°C, at the rate of 0.79°C./minute. After this temperature has been maintained for 25 minutes, heating is stopped, and, during the cooling process, the solution is diluted by successive additions of N-methyl-pyrrolidone corresponding to a total of 7,700 g. The solution obtained has an absolute viscosity of 540 poises, and a solids content of 15.9%. The inherent viscosity of the dissolved polymer is 1.28.

This solution is wet spun through a spinneret having 64,0.05 mm. diameter holes and at a temperature of 80°C, into a coagulation bath consisting of 60 parts of N-methylpyrrolidone and 40 parts of water (expressed by weight) at 50°C. After coagulation, the yarn is stretched in air in a ratio of 2.1, followed by an additional stretching in a tube of length 2 meters, in air, at 340°C, at a rate of 15 cm/minute and in a ratio of 1.87. The final yarn has the following characteristics:

| | |
|---|---|
| gauge per filament | 1.42 dtex |
| tenacity | 41.3 g/tex |
| elongation at break | 16.3% |

The inflammability and post-incandescence characteristics of the yarn are shown in Table V.

TABLE V

| | "LCOC" index | Height destroyed in cm. | Application of the flame in seconds | Duration of combustion in seconds | Post incandescence in seconds |
|---|---|---|---|---|---|
| "LCOC" index | 29.5 | | | | |
| AATCC 34-1969 test | | 8 | | 0 | |
| Gas flame test | | | 5 | 4 | 0 |
| | | | 10 | 6 | 0 |
| | | | 20 | 15 | 0 |
| | | | 30 | 16 | 0 |

By way of comparison, a polyamide-imide is prepared in accordance with a similar procedure without the monosodium salt of bis-(4-carboxy-phenyl)-phosphonic acid. In this csae, the reagents are 380 g. (1.5 mols) of 98.75% pure 4,4'-diisocyanato-diphenyl-methane, 230 g. (1.2 mols) of trimellitic anhydride, 40 g. (0.24 mol) of terephthalic acid, 16 g. (0.06 mol) of sodium 3,5-decarboxy-benzenesulphonate, and 1,444 g. of N-methyl-2-pyrrolidone. The working conditions are chosen to be suitable for this type of polymer; that is to say, the temperature is raised so that the reaction mixture reaches 135°C, after 30 minutes; it is kept for 25 minutes at this temperature, and the temperature is then raised to 200°C, over the course of 45 minutes. The operation is stopped after a total period of 125 minutes heating, and the solution is then cooled slowly, while 910 g. of N-methylpyrrolidone are added. The final solution has an absolute viscosity of 440 poises, and a solids content of 18.9% (expressed by weight), and the inherent viscosity of the dissolved polymer is 1.47.

This solution is wet spun through a spinneret with 64 0.05 mm. diameter holes, at a temperature of 100°C, into a coagulation bath at 20°C, consisting of 62 parts of N-methyl-pyrrolidone and 38 parts of water (expressed by weight), at a spinning rate of 11 m/minute. The coagulated yarn is stretched in air in a ratio of 2.72 followed by washing on a roller at the rate of 19.8 m/minute, and an additional stretching, in air, in a tube of length 2 meters, at 340°C, at a rate of 12 m/minute and in a ratio of 2.36. The final yarn has the following characteristics:

| | |
|---|---|
| gauge per filament | 2.02 dtex |
| tenacity | 47.1 g/tex |
| elongation at break | 14.3% |

The results of the inflammability and postincandescence tests are given in Table VI.

TABLE VI

| | "LCOC" index | Height destroyed in cm. | Application of the flame in seconds | Duration of combustion in seconds | Post-incandescence in seconds |
|---|---|---|---|---|---|
| "LCOC" index AATCC 34-1969 test | 27.8 | 23 | | 1 | 45 |
| Gas flame test | | | 5 | 5 | 18 |
| | | | 10 | 2 | 20 |
| | | | 20 | 10 | 68 |
| | | | 30 | 8 | 52 |

Comparison of Tables V and VI shows the better behaviour, both in inflammability and post-incandescence, of the sample containing the monosodium salt of bis-(4-carboxyphenyl)-phosphinic acid.

EXAMPLE 6

362.7 g. (1.44 mols) of 99.4% pure 4,4'-diisocyanatodiphenyl-methane, 347.3 g. (1.345 mols) of 99.85% of pure 4,4'-dicarboxy-diphenyl ether, 19.2 g. (0.056 mol) of the monosodium salt of bis-(4-carboxy-phenyl)-phosphinic acid as prepared in Example 1, and 1,415 g. of N-methyl-2-pyrrolidone are introduced into a 4 liter reactor equipped with heating and stirring means and heated to 100°C. The reaction mixture is rapidly heated to 125°C, kept for 25 minutes at this temperature, while the $CO_2$ produced by the reaction is evolved, and then heated to 197°C, at the rate of 2.4°C, per minute. The operation is stopped after 160 minutes and the mixture allowed to cool while a total of 1,235 g. of N-methylpyrrolidone is added gradually, in amounts of the order of 100 to 200 g. The final solution has an absolute viscosity of 410 poises, and a solids content of 18.45%; the inherent viscosity of the dissolved polymer is 0.94.

This solution is extruded at the rate of 11 m/minute through a spinneret heated to 80°C, possessing 64 0.06 mm diameter holes, into a coagulation bath which consists of 59 parts of N-methylpyrrolidone and 41 parts of water (expressed by weight) and is at a temperature of 50°C. The coagulated yarn is stretched, in air, in a ratio of 2.35, washed on a roller and then wound up at the rate of 26 m/minute. The mechanical characteristics of the yarn obtained are:

| | |
|---|---|
| gauge per filament | 2.71 dtex |
| tenacity | 18.2 g/tex |
| elongation at break | 20% |

After additional stretching, in air, at 250°C, in a tube of length 2 meters, at the rate of 15 m/minute, in a ratio of 1.31, these characteristics become:

| | |
|---|---|
| gauge per filament | 2.03 dtex |
| tenacity | 26.2 g/tex |
| elongation at break | 9.8% |

The results of the inflammability tests are given in Table VII.

TABLE VII

| | "LCOC" index | Height destroyed in cm. | Application of the flame in seconds | Duration of combustion in seconds | Post-incandescence in seconds |
|---|---|---|---|---|---|
| "LCOC" index AATCC 34-1969 test | 24.7 | 6 | | 0 | |
| Gas flame test | | | 5 | 9 | 0 |
| | | | 10 | 9 | 0 |
| | | | 20 | 9 | 0 |
| | | | 30 | 4 | 0 |

The post-incandescence of the yarn obtained is zero.

EXAMPLE 7

361 g. (1.435 mols) of 99.4% pure 4,4'-diisocyanatodiphenyl-methane, 340 g. (1.315 mols) of 99.85% pure 4,4'-dicarboxy-diphenyl ether, 28.8 g. (0.084 mol) of the monosodium salt of bis-(4-carboxyphenyl)-phosphinic acid as prepared in Example 1, and 1,415 g. of N-methyl-2-pyrrolidone are introduced into a 4 liter reactor, at a temperature of 100°C. The temperature of the reaction mixture and the successive dilutions are adjusted as follows:

| Time minutes | Temperature of the mixture °C. | Additions of N-methylpyrrolidone g. |
|---|---|---|
| 0 | 25 | |
| 50 | 127 | |
| 60 | 127 | |
| 70 | 129 | 144 |
| 80 | 132 | 195 |
| 95 | 153 | 51.5 |
| 125 | 174 | 124 |
| 130 | 180 | 154 |
| 170 | 180 | 915 |

The final solution has an absolute viscosity of 455 poises and a solids content of 16.8 % (by weight). The inherent viscosity of the dissolved polymer is 1.06.

In order to produce a film, this solution is diluted until it has an absolute viscosity of approximately 100 poises, and then cast on a glass plate. The film is dried first at 120°C, under 650 mm. of mercury and then detached from the plate and dried under a vacuum of about one millimetre of mercury, at between 150°C, and 200°C. At the final stage, the film is 0.0345 mm. thick. Its tensometric characteristics are as follows:

| | |
|---|---|
| tensile strength | 7,250 g/mm² |
| elongation at break | 19% |

The results of the inflammability tests are given in Table VIII.

TABLE VIII

| | "LCOC" index | Height destroyed in cm. | Application of the flame in seconds | Duration of combustion in seconds | Post-incandescence in seconds |
|---|---|---|---|---|---|
| "LCOC" index AATCC 34-1969 test | 33.9 | 9 | | 0 | 0 |
| Gas flame test | | | 5 | 0 | 0 |
| | | | 10 | 0 | 0 |
| | | | 20 | 0 | 0 |
| | | | 30 | 2 | 0 |

The post-incandescence of the sample of film is zero.

EXAMPLE 8

The reagents of Example 7 are mixed together in the same proportions, and the temperature of the reaction mixture, and the successive dilutions are as follows:

| Time minutes | Temperature of the mixture °C. | Additions of N-methylpyrrolidone g. |
|---|---|---|
| 0 | 25 | |
| 45 | 135 | |
| 55 | 132 | 330 |
| 75 | 132 | 144 |
| 90 | 153 | 124 |
| 105 | 179 | 51.5 |
| 125 | 190 | 103 |
| 150 | 200 | 103 |
| 165 | 200 | 680 |

The final solution has an absolute viscosity of 430 poises and a solids content of 17.05% expressed by weight. The inherent viscosity of the dissolved polymer is 0.98.

This solution is wet spun in accordance with the process described in Example 6. The yarn which has undergone additional stretching has the following tensometric characteristics:

| | |
|---|---|
| gauge per filament | 2 dtex |
| tenacity | 26.5 g/tex |
| elongation at break | 16.3% |

The results of the inflammability tests are given in Table IX.

TABLE IX

| | "LCOC" index | Height destroyed in cm | Application of the flame in seconds | Duration of combustion in seconds | Post-incandescence in seconds |
|---|---|---|---|---|---|
| "LCOC" index AATCC 34-1969 test | 26.1 | 9 | | 0 | 0 |
| Gas flame test | | | 5 | 4 | 0 |
| | | | 10 | 6 | 0 |
| | | | 20 | 6 | 0 |
| | | | 30 | 7 | 0 |

The post-incandescence of the yarn is zero.

EXAMPLE 9

39.0 g (0.156 mol) of 99.4 % pure 4,4'-diisocyanatodiphenyl-methane, 27.1 g (0.105 mol) of 99.85 % pure 4,4'-dicarboxy-diphenyl ether, 8.9 g (0.036 mol) of 98.1 % pure 4,4'-dicarboxy-diphenyl, 3 g (0.009 mol of the 97.5 % pure monosodium salt of bis-(4-carboxy-phenyl)-phosphinic acid, and 143 g of N-methyl-2-pyrrolidone are introduced into a 500 ml reactor. The temperature of the reaction mixture is raised uniformly at the rate of 5.75°C/minute to 135°C, this being the temperature at or near which a large amount of $CO_2$ is evolved, and then at the rate of 1.07°C/minute to 210°C. It is kept for 30 minutes at this temperature, and during the operation, 156 g of N-methylpyrrolidone are added in two stages. After cooling, the solution has an absolute viscosity of 395 poises; the solids content is 18.15 % (expressed by weight) and the inherent viscosity of the dissolved polymer is 0.83.

For film formation, the solution is diluted with N-methylpyrrolidone so as to bring its absolute viscosity to 100 poises. The film is produced by the process described in Example 7. Its tensometric characteristics are:

| | |
|---|---|
| tensile strength | 7,800 g/mm² |

-continued elongation at break        16 %

The inflammability properties are given in Table X.

TABLE X

| | "LCOC" index | Height destoryed in cm | Application of the flame in seconds | Duration of combustion in seconds | Post-incandescence in seconds |
|---|---|---|---|---|---|
| "LCOC" index AATCC 34-1969 test | 33 | 8.3 | | 0 | 0 |
| Gas flame test | | | 5 | 0 | 0 |
| | | | 10 | 0 | 0 |
| | | | 20 | 0 | 0 |
| | | | 30 | 0 | 0 |

The post-incandescence of the sample is zero.

EXAMPLE 10

361 g (1.435 mols) of 99.4 % pure 4,4'-diisocyanatodiphenyl-methane, 289.4 g (1.12 mols) of 99.85 % pure 4,4'-dicarboxy-diphenyl ether, 48.4 g (0.196 mol) of 4,4'-dicarboxy-diphenyl, 28.2 g (0.084 mol) of the 97.5 % pure monosodium salt of bis-(4-carboxy-phenyl)-phosphinic acid, and 143 g of N-methyl-2-pyrrolidone are introduced into a 4 liter reactor. The temperature is raised over the course of 45 minutes to 139°C and kept for 20 minutes at this temperature while a large amount of $CO_2$ is evolved. The reaction mixture is then heated so as to reach 200°C when the total duration of the heating operation as been 145 minutes. Successive additions of 1,110 g in all of N-methylpyrrolidone make it possible to keep the absolute viscosity at a level such that a homogeneous reaction takes place.

The solution obtained has an absolute viscosity of 525 poises, and a solids content of 18.45% (expressed by weight). The inherent viscosity of the dissolved polymer is 0.95. The solution is extruded at the rate of 11 m/minute through a spinneret heated to 80°C, possessing 64 0.05 mm diameter holes, into a coagulation bath which consists of 55 parts of N-methyl-pyrrolidone and 45 parts of water (expressed by weight) and is at a temperature of 20°C. The coagulated yarn is stretched, in air, in a ratio of 1.8, washed on a roller and then wound up at the rate of 20 m/minute. The yarn has the following mechanical characteristics:

| | |
|---|---|
| gauge per filament | 4.85 dtex |
| tenacity | 11 g/tex |
| elongation at break | 14.6 % |

After additional stretching, in air, at 250°C, in a tube of length 2 metres, at the rate of 15 m/minute, in a ratio of 1.30, these characteristics become:

| | |
|---|---|
| gauge per filament | 3.69 dtex |
| tenacity | 17.6 g/tex |
| elongation at break | 9.4 % |

The results of the inflammability tests are given in Table XI.

TABLE XI

| | "LCOC" index | Height destroyed in cm | Application of the flame in seconds | Duration of combustion in seconds | Post-incandescence in seconds |
|---|---|---|---|---|---|
| "LCOC" index AATCC 34-1969 test | 28.6 | 11 | | 1 | 0 |
| Gas flame test | | | 5 | 3 | 0 |
| | | | 10 | 10 | 0 |
| | | | 20 | 9 | 0 |
| | | | 30 | 0 | 0 |

This yarn does not show any post-incandescence

I claim:
1. Aromatic polymers having an inherent viscosity of greater than 0.5 and consisting essentially of units of a metal salt of an arylene-bis-(phenylene-phosphinic acid)-4,4'-di-carboxamide of the formula:

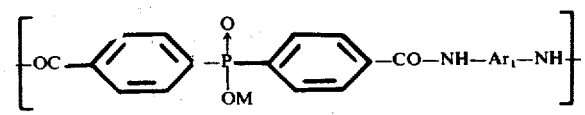

with units of at least one of the two types:
diamide units of the formula —NH—Ar₁—NH—CO—Ar—CO— and
amide-imide units of the formula:

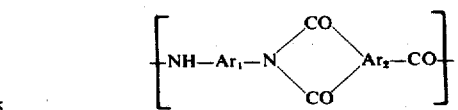

in which Ar represents a divalent aromatic, or arylaliphatic radical, Ar₁ represents a divalent aromatic radical, Ar₂ represents a trivalent aromatic radical and M represents an alkali metal, the units of the metal salt of the arylene-bis-(phenylene-phosphinic acid)-4,4'-dicarboxyamide being present in a proportion of at least 2 per 100 units in the polymer.

2. An aromatic polymer according to claim 1 which also contains diimide units of the formula:

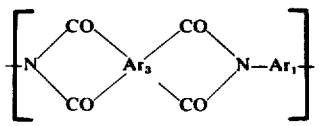

in which $Ar_3$ represents a tetravalent aromatic radical.

3. An aromatic polymer according to claim 1 in which the proportion of units of the metal salt of the arylene-bis-(phenylene-phosphinic acid)-4,4'-dicarboxamide is at least 4 per 100 units in the polymer.

4. An aromatic polymer according to claim 2 in which the proportion of units of the metal salt of the arylene-bis-(phenylene-phosphinic acid)-4,4'-dicarboxamide is at least 4 per 100 units in the polymer.

5. An aromatic polymer according to claim 1 in which $Ar_1$ is selected from 4,4'-diphenylether and 4,4'-diphenylmethane, M is sodium Ar (when present) is selected from p-phenylene and m-phenylene and $Ar_2$ (when present) is selected from

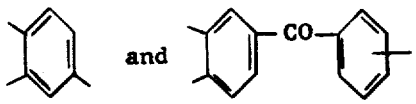

and the polymer contains no diimide units.

6. An aromatic polymer according to claim 2 in which $Ar_1$ is selected from 4,4'-diphenylether and 4,4'-diphenylmethane, M is sodium Ar (when present) is selected from p-phenylene and m-phenylene and $Ar_2$ (when present) is selected from

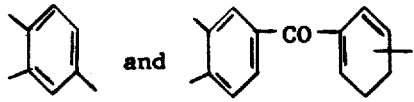

and $Ar_3$ is selected from

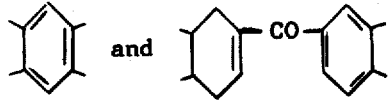

7. Process for the manufacture of an aromatic polymer according to claim 1 which comprises reacting together an aromatic diisocyanate of formula OCN—Ar$_1$—NCO, an alkali metal salt of bis-(4-carboxy-phenyl)-phosphinic acid of formula:

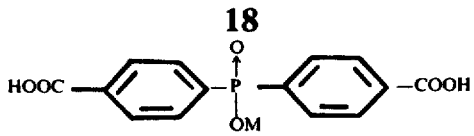

and at least one acid reagent selected from a dicarboxylic acid of formula HOOC—Ar—COOH and an aromatic acid anhydride of formula

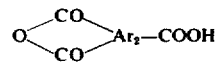

(wherein $Ar_1$, Ar, $Ar_2$ and M are defined in claim 1), in an anhydrous aprotic polar solvent medium, in substantially stoichiometric proportions, the temperature of the reaction mixture being raised gradually, during the reaction, to at least 160°C. said dicarboxylic acid being used in the amount between 5 and 98 moles per 100 moles of all the acid reagents and said alkali metal salt being used in the amount of at least 2 moles per 100 moles of all the acid reagents.

8. Process according to claim 7 wherein the reaction mixture also contains an aromatic dianhydride of the formula:

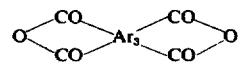

wherein $Ar_3$ is as defined in claim 1.

9. Process according to claim 7 wherein the temperature of the reaction mixture is raised to at least 190°C.

10. Process according to claim 8 wherein the temperature of the reaction mixture is raised to at least 190°C.

11. Process according to claim 7 wherein the reaction mixture contains 10 to 80 mols of the acid HOOC—Ar—COOH per 100 mols of all the acid reagents.

12. Process according to claim 7 wherein the aprotic polar solvent is dimethylformamide, dimethylacetamide, hexamethylphosphoramide, tetramethylurea, N-methyl-2-pyrrolidone or tetramethylenesulphone.

13. Process according to claim 7 wherein the total concentration of reagents in the reaction mixture is 20 to 40% expressed as the weight of polymer produced per 100 g of solution.

14. Process according to claim 7 wherein the reagents are mixed at ambient temperature and the temperature of the reaction mixture is raised at 0.1° to 5°C per minute to a maximum temperature of at most 200°C., the temperature being kept constant for about 2 hours at a temperature between 110° and 170°C.

15. Process according to claim 7 wherein the polymer solution obtained has a viscosity, after dilution if necessary, of 200 to 5000 poises.

* * * * *